United States Patent
Tipton et al.

(10) Patent No.: US 10,271,174 B2
(45) Date of Patent: *Apr. 23, 2019

(54) AGGREGATION OF MOBILE DEVICE DATA FOR FACILITATION OF RULE-BASED ACTION

(71) Applicant: AT&T Mobility II LLC, Atlanta, GA (US)

(72) Inventors: Rick Tipton, Corryton, TN (US); Christine Thomas, Atlanta, GA (US); Mark Austin, Roswell, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,898

(22) Filed: Jul. 16, 2018

(65) Prior Publication Data

US 2018/0343541 A1 Nov. 29, 2018

Related U.S. Application Data

(63) Continuation of application No. 15/297,473, filed on Oct. 19, 2016, now Pat. No. 10,051,420, which is a
(Continued)

(51) Int. Cl.
*H04W 24/00* (2009.01)
*H04W 4/02* (2018.01)
(Continued)

(52) U.S. Cl.
CPC ........ *H04W 4/023* (2013.01); *G06Q 30/0261* (2013.01); *G06Q 30/0267* (2013.01); *H04M 1/72572* (2013.01); *H04W 4/029* (2018.02); *H04W 4/18* (2013.01); *H04W 64/00* (2013.01); *H04W 84/12* (2013.01)

(58) Field of Classification Search
None
See application file for complete search history.

(56) References Cited

U.S. PATENT DOCUMENTS

| 7,801,538 B2 | 9/2010 | Weiser et al. |
| 8,335,524 B2 | 12/2012 | Shutter |

(Continued)

FOREIGN PATENT DOCUMENTS

| AU | 2012100971 | 9/2012 |
| WO | 2013086028 | 6/2013 |
| WO | 2014032039 | 2/2014 |

OTHER PUBLICATIONS

Office Action for U.S. Appl. No. 14/321,110 dated Jan. 21, 2016, 19 pages.
(Continued)

*Primary Examiner* — Erika A Washington
(74) *Attorney, Agent, or Firm* — Amin, Turocy & Watson, LLP

(57) ABSTRACT

A network device can be placed in a central location to detect and disseminate mobile device data via a wireless network. The network device actions can be determined by an end-user device that receives subscription-based data. The end-user can determine parameters for communication between the network, network device, and the mobile device and determine actions based on the communication.

20 Claims, 12 Drawing Sheets

Related U.S. Application Data continuation of application No. 14/321,110, filed on Jul. 1, 2014, now Pat. No. 9,503,853.

(51) Int. Cl.
| | | |
|---|---|---|
| *G06Q 30/02* | (2012.01) | |
| *H04M 1/725* | (2006.01) | |
| *H04W 4/18* | (2009.01) | |
| *H04W 4/029* | (2018.01) | |
| *H04W 64/00* | (2009.01) | |
| *H04W 84/12* | (2009.01) | |

(56) References Cited

U.S. PATENT DOCUMENTS

| | | | |
|---|---|---|---|
| 8,471,701 B2 | 6/2013 | Yariv et al. | |
| 8,537,003 B2 | 6/2013 | Yariv et al. | |
| 8,593,276 B2 | 11/2013 | Doyle | |
| 8,798,643 B1 | 8/2014 | Boyle | |
| 9,503,853 B2 * | 11/2016 | Tipton | H04W 4/029 |
| 10,051,420 B2 * | 8/2018 | Tipton | H04W 4/029 |
| 2003/0004802 A1 | 1/2003 | Callegari | |
| 2005/0156715 A1 | 7/2005 | Zou et al. | |
| 2006/0236257 A1 | 10/2006 | Othmer et al. | |
| 2007/0167174 A1 | 7/2007 | Halcrow | |
| 2008/0125965 A1 | 5/2008 | Carani et al. | |
| 2008/0133336 A1 | 6/2008 | Altman et al. | |
| 2010/0042940 A1 | 2/2010 | Monday et al. | |
| 2010/0253508 A1 | 10/2010 | Koen et al. | |
| 2012/0001928 A1 | 1/2012 | Sheha et al. | |
| 2012/0115453 A1 | 5/2012 | Zheng | |
| 2012/0197690 A1 | 8/2012 | Agulnek | |
| 2012/0214515 A1 | 8/2012 | Davis et al. | |
| 2012/0225672 A1 | 9/2012 | Tholkes et al. | |
| 2012/0284093 A1 | 11/2012 | Evans | |
| 2012/0307645 A1 | 12/2012 | Grosman et al. | |
| 2013/0091016 A1 | 4/2013 | Shutter | |
| 2013/0091452 A1 | 4/2013 | Sorden et al. | |
| 2013/0099977 A1 | 4/2013 | Sheshadri et al. | |
| 2013/0130719 A1 | 5/2013 | Busch | |
| 2013/0218595 A1 | 8/2013 | Burkett | |
| 2013/0275221 A1 | 10/2013 | Zeto, III et al. | |
| 2013/0297422 A1 | 11/2013 | Hunter et al. | |
| 2014/0113661 A1 | 4/2014 | Yoo | |
| 2015/0024782 A1 | 1/2015 | Edge | |
| 2015/0331583 A1 | 11/2015 | Zhang | |
| 2015/0356607 A1 | 12/2015 | Civanlar et al. | |
| 2015/0365787 A1 | 12/2015 | Farrell | |

OTHER PUBLICATIONS

Non-Final Office Action received for U.S. Appl. No. 15/297,473, dated Dec. 13, 2017, 20 pages.

Geofence, Push & iBeacon—Mobile Marketing Made Easy, The Mobile Marketing Platform, 2014, 5 Pages. Retrieved on Apr. 3, 2014 at http://moball.tv/?gclid=CJu4582uxL0CFUVp7AodWS0AQg.

Location Labs Announces General Availability of its Mobile Geofencing Platform and Launches Location-Based Spatial Data Storage, Press Release, Feb. 15, 2011, Location Labs, 3 Pages. Retrieved on Apr. 3, 2014 at http://www.locationlabs.com/location-labs-announces-general-availability.

Social/Local/Mobile/Commerce, Social Networking and Mobile Apps—Industry Solutions, Maponics LLC, 2 Pages. Retrieved on Apr. 3, 2014 at http://www.maponics.com/solutions/social-local-mobile-commercepi_ad id=19626183067&gclid=CNaYx6mvxL0CFbTm7AoddmOAZA.

Geo-Fencing, Notificare, 2013, 2 Pages. Retrieved on Apr. 3, 2014 at http://notificare/location-based-messaging/geo-fencing/?gclid=Clvgp_2vxL0CFRQV7AodvA8AIQ.

Venkatesh, "6 Geofencing Tips for Retailers to Deliver Targeted Advertising", Luxury Daily, Oct. 15, 2013, Mobile Commerce Daily, 2 Pages. Retrieved on Apr. 3, 2014 at http://www.luxurydaily.com/6-tips-for-geofencing-for-retailers-to-deliver-targeted-advertising/.

Geofencing Messages Made Easy, 2014, PLOT Projects, 3 Pages. Retrieved on Apr. 3, 2014 at http://www.plotprojects.com/geofencing-2m/?utm_expid=66248451-1.stYXbv4eSdi8UdkSjjTzFQ.1&gclid=CMqrsMOyxL0CFUNo7Aodtl8A8g.

* cited by examiner

AGGREGATION OF MOBILE DEVICE DATA FOR FACILITATION OF RULE-BASED ACTION

CROSS-REFERENCE TO RELATED APPLICATION

This patent application is a continuation of, and claims priority to each of, U.S. patent application Ser. No. 15/297,473, now U.S. Pat. No. 10,051,420, filed on Oct. 19, 2016, and entitled "AGGREGATION OF MOBILE DEVICE DATA FOR FACILITATION OF RULE-BASED ACTION", which is a continuation of U.S. patent application Ser. No. 14/321,110, now U.S. Pat. No. 9,503,853, filed on Jul. 1, 2014, and entitled "AGGREGATION OF MOBILE DEVICE DATA FOR FACILITATION OF RULE-BASED ACTION". The entireties of the foregoing applications are hereby incorporated by reference herein.

TECHNICAL FIELD

This disclosure relates generally to aggregation of mobile device data, such as location data, e.g., via an indoor positioning system, to facilitate an action based on the aggregated mobile device data and rule(s) defined via a user interface.

BACKGROUND

Indoor position systems (IPSs) comprise a network of devices used to wirelessly locate objects or people inside a building. Instead of using satellites, an IPS relies on nearby anchors (e.g., nodes with a known position), which either actively locate tags or provide ambient location or environmental context for devices to get sensed. These anchors can use different ways to determine positions of objects or people including: choke point concepts, grid concepts, long-range sensor concepts, angle of arrival, time of arrival, signal strength indication, or inertial measurements, or combinations thereof. The localized nature of an IPS has resulted in systems making use of various optical, radio, or even acoustic technologies.

Most applications currently rely on global positioning system (GPS), and function poorly indoors as a result. Due to signal attenuation caused by construction materials, satellite based GPS signals lose significant power indoors decreasing coverage for receivers. In addition, multiple reflections at surfaces cause multi-path propagation, which can cause uncontrollable error. Indoor positioning is, however, a vehicle for the expansion of location-aware mobile computing indoors.

Other IPS platforms can be integrated into the infrastructure of buildings, but this type of service is costly and labor intensive because it involves custom engineering at each location by assimilating and analyzing radio frequency (RF) measurement data, identifying and mapping radiation sources, and studying building area floor plans and obstructions.

The above-described background relating to IPS systems is merely intended to provide a contextual overview, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
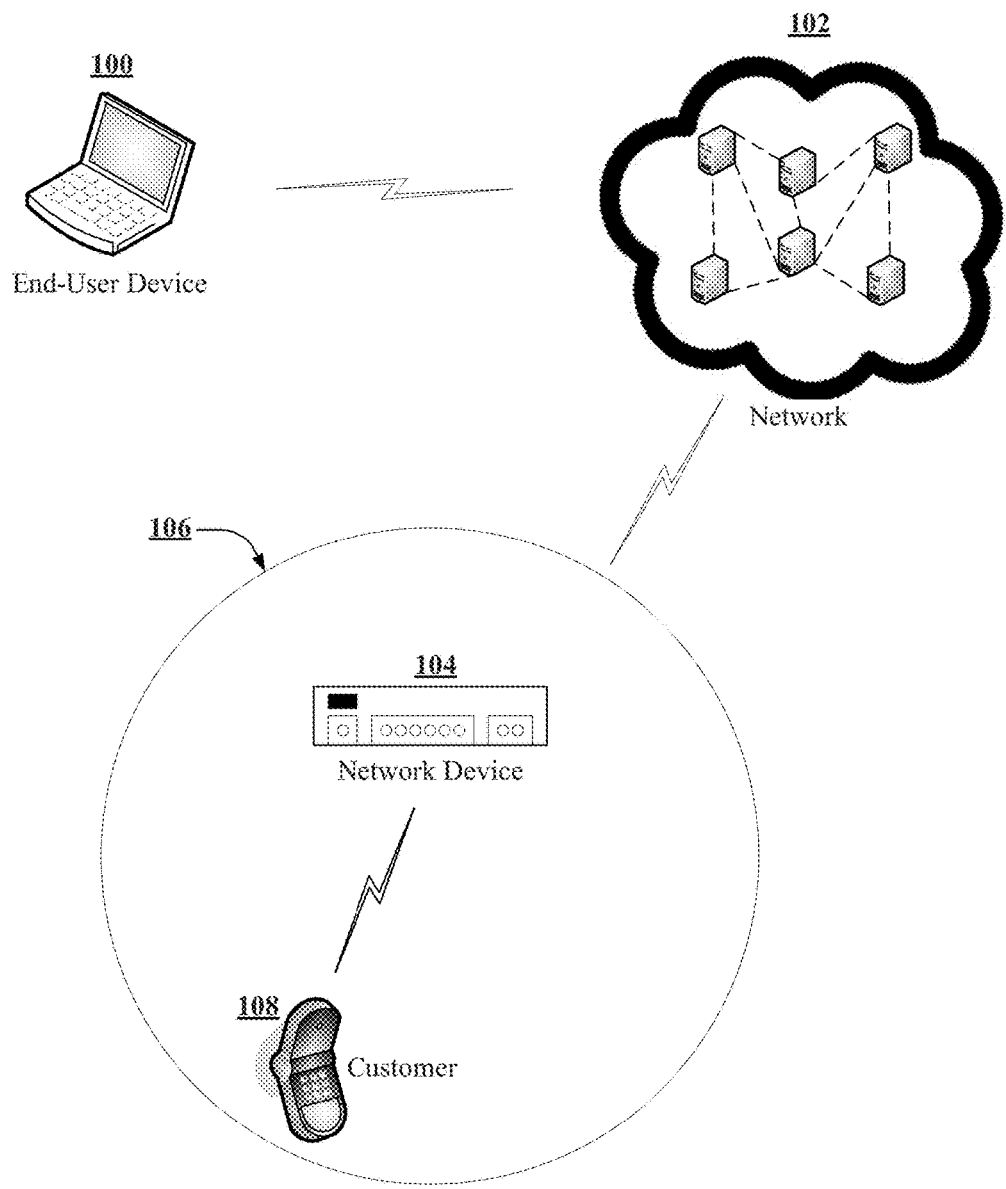
FIG. 1 illustrates an example system for determining when a mobile device is within range of a network device and communicating mobile device data to the network based on a defined rule.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of various embodiments presented herein, to correct for the above identified deficiencies and other drawbacks of GPS networks, various embodiments are described herein to facilitate the use of IPS networks.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

Utilizing a configurable IPS in conjunction with a wireless network and a user interface for creating rules can aid in a customer experience via their mobile devices. Described herein are systems, methods, articles of manufacture, and other embodiments or implementations that can facilitate usage of an IPS and associated wireless networks. The various embodiments can be implemented in connection with any type of device with a connection to a communications network (e.g., a wireless communications network, the Internet, or the like), such as a mobile handset, a computer, a handheld device, or the like.

An IPS device can be used to send targeted messages to a customer's mobile device within a specific area or perimeter designated by a user device associated with a user identity, such as a business owner identity or administrator identity. The targeted messages can be sent via Wireless Fidelity (Wi-Fi) protocols or other RF protocols based on information that is defined by the user identity via the user device. User input associated with the user identity can be entered via a website, an application, or other graphical user interface (GUI). This process can allow the user to configure an IPS device to send custom messages based on entry or exit of a mobile device into or from designated areas of a specific location including, but not limited to, businesses or warehouses. Therefore, this process can reduce or eliminate the need for labor-intensive custom engineering generally associated with larger stores. This process can increase scalability and reduce costs for smaller business. The system can comprise an opt-in subscription-based service that can determine charges based on a number of defined rules created and/or the number of IPS devices utilized to create a version of the messaging platform. The subscription-based system can allow reception of Wi-Fi media access control (MAC) addresses along with respective targeted messages for each of the MAC addresses.

Within the subscription-based platform, location-specific messages can be assigned and scheduled to respective locations via the GUI. Time or behavioral-based rules for disseminating the messages can also be set up via the GUI. The location data and traffic reports can be collected and stored by the IPS and sent to network device of a wireless network, where the location data and traffic reports can later be reviewed and analyzed via a user device.

In one embodiment, a wireless network can communicate with an end-user device and a network device. User-defined rules can be sent from the end-user device to the network. The network can send those rules to the network device where the network device can perform an action based on the set of rules and a nearby mobile device.

According to another embodiment, described herein is a method for determining that a mobile device is within range of a network device. The method can then initiate an action to be performed based on a defined rule.

According to yet another embodiment, an article of manufacture, such as a computer readable storage medium or the like, can store instructions that, when executed by a computing device, can facilitate initiation of an action based on a mobile device being in range of a network device. The article of manufacture can also allow a user device to define rules that must be satisfied prior to the initiation of the action.

Additionally, according to a further embodiment, described herein is a system that can facilitate a connection between a user device, a network device, and a mobile device for the purpose of initiating an action at the mobile device. The system can also facilitate a storing of location data of the mobile device. The system can include a display component or GUI that allows a user device for defining rules for initiating the action at the mobile device. The system can also include one or more servers in a cloud-computing environment that can store information about mobile devices and system preferences of a identity.

These and other embodiments or implementations are described in more detail below with reference to the drawings.

Referring now to FIG. 1, illustrated is a system for determining when a mobile 108 device is within a range 106 of a network device 104 and communicating mobile device 108 data to the network 102 based on a defined rule. An end-user device 100 can be used to store or transmit data to the network 102. The end-user device 100 can be any device that can connect to the network 102 including, but is not limited to, a mobile phone, a laptop, etc. The end-user device 100 can connect to the network 102 via any wireless means including, but not limited to, the internet, Wi-Fi, Bluetooth, 3G, 4G, or the like.

A subscription-based platform, including a service or application, can be accessed via the end-user device 100. The subscription-based platform can allow selection of rules at an end-user device 100 to apply to the network device 104. The subscription-based platform can require a fee for opting into the service to allow setting of rules for the network devices 104. For example, a rule can be set at the end-user device 100 which can define the range 106 of the network device 104 to be twenty feet. Thus, a mobile device 108 must be within twenty feet of the network device 104 before any communication can take place. The mobile device 108 can connect to the network 102 via the network device 104 by any wireless means including, but not limited to, the internet, Wi-Fi, Bluetooth, 3G, 4G, or the like. Other rules can also be defined at the end-user device 100. For instance, the end-user device 100 can allow for setting a rule that allows a message to be sent to any mobile device 108 within the range 106 of the network device 104.

The message sent to the mobile device 108 can include, but is not limited to, text, video, coupons, etc. The message sent to the mobile device 108 can also prompt a mobile device user, namely a customer, to perform some action on the mobile device 108. The network device 104 can receive data from the mobile device 108 including, but not limited to, network device-prompted responses, current mobile device 108 location data, previous mobile device 108 location data, time a mobile device 108 has spent in a specific location, etc.

The network device 104 can also receive data from the mobile device 108 with regard to its distance from another mobile device 108 within the range 106. The data received by the network device 104 can be stored at the network device 104 and/or forwarded to the network 102. The network 102 can store the data received from the network device 104 and/or forward the data to the subscription-based platform. The subscription-based platform can allow an end-user to access and analyze the aggregated data at the end-user device 100.

Figure 2:
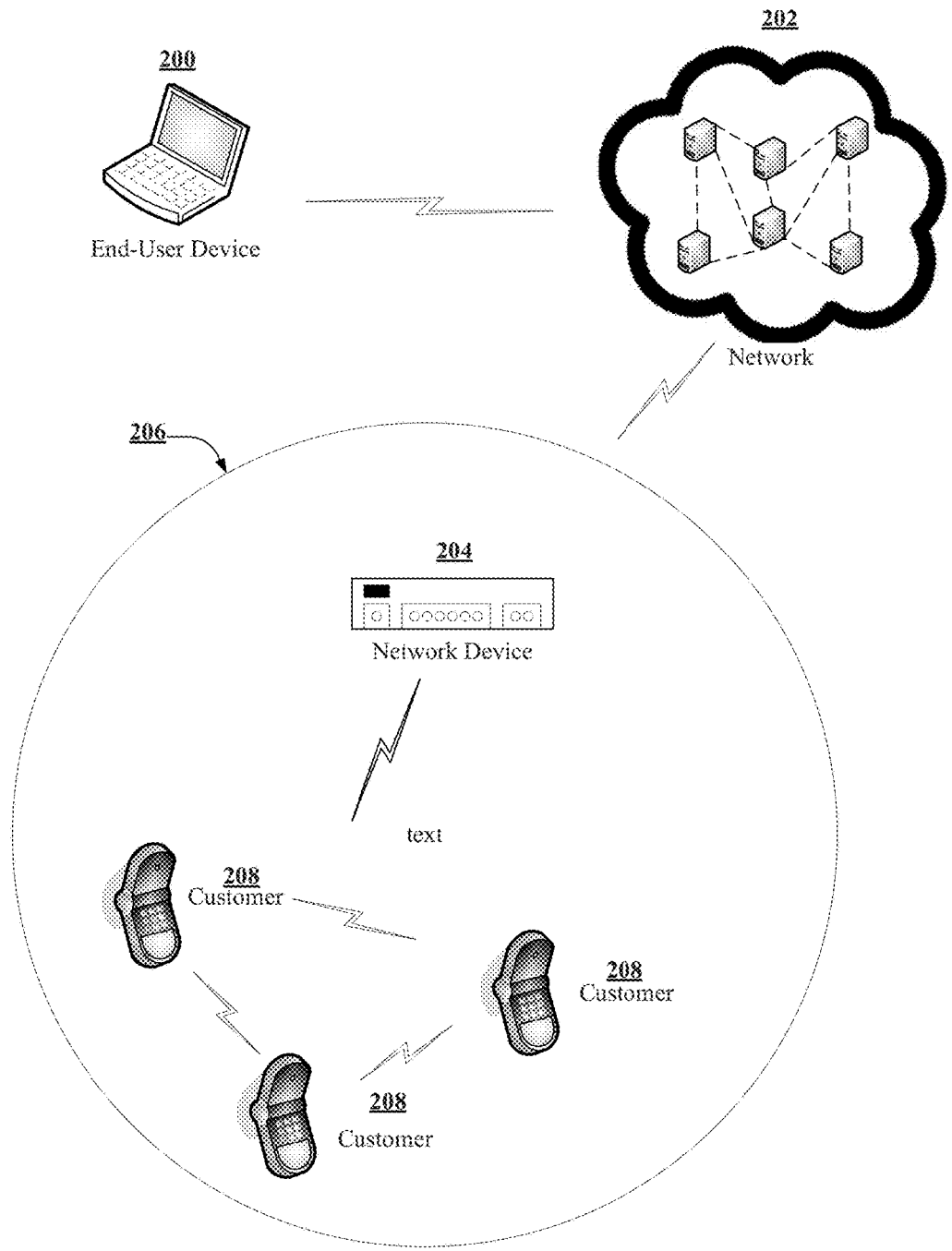
FIG. 2 illustrates an example system for determining when multiple mobile devices are within range of a network device and communicating mobile device location data, in relation to each mobile device, to the network based on a defined rule.

Referring now to FIG. 2, illustrated is a system for determining when multiple mobile devices 208 are within a range 206 of a network device 204 and communicating mobile device 208 location data, in relation to each mobile device 208, to the network 202 based on a defined rule. An end-user device 200 can be used to store or transmit data to the network 202. The end-user device 200 can be any device that can connect to the network 202 including, but not limited to, a mobile phone, a laptop, etc. The end-user device 200 can connect to the network 202 via any wireless means including, but not limited to, the internet, Wi-Fi, Bluetooth, 3G, 4G, or the like.

A subscription-based platform, including a service or application, can be accessed via the end-user device 200. The subscription-based platform can allow selection of rules at an end-user device 200 to apply to the network device 204. The subscription-based platform can require a fee for opting into the service to set rules for the network devices 204. For example, the end-user device 200 can allow for defining a range 206 of the network device to be twenty feet. Thus, in the previous scenario, a mobile device 208 must be within twenty feet of the network device 204 before any communication can take place. The mobile device 208 can connect to the network 202 via the network device 204 by any wireless means including, but not limited to, the internet, Wi-Fi, Bluetooth, 3G, 4G, or the like. Other rules can also be defined at the end-user device 200. For instance, the end-user device 200 can allow for setting a rule to have a message sent to any mobile device 208 within the range 206 of the network device 204.

The message sent to the mobile device 208 can include, but is not limited to, text, video, coupons, etc. The message sent to the mobile device 208 can also prompt a mobile device user, namely a customer, to perform some action at the mobile device 208. The network device 204 can receive data from the mobile device 208 including, but not limited to, network device-prompted responses, current mobile device 208 location data, previous mobile device 208 location data, time a mobile device 208 has spent in a specific location, etc.

The network device 204 can also receive data from the mobile device 208 with regard to its distance from other mobile devices 208 within the range 206. Data relating to a mobile device's 208 distances from other mobile devices 208 can be used to determine customer habits based on location information. The data received by the network device 204 can be stored at the network device 204 and/or forwarded to the network 202. The network 202 can store the data received from the network device 204 and/or forward the data to the subscription-based platform. The subscription-based platform can allow for access and analysis of the aggregated data from the end-user device 200.

Figure 3:
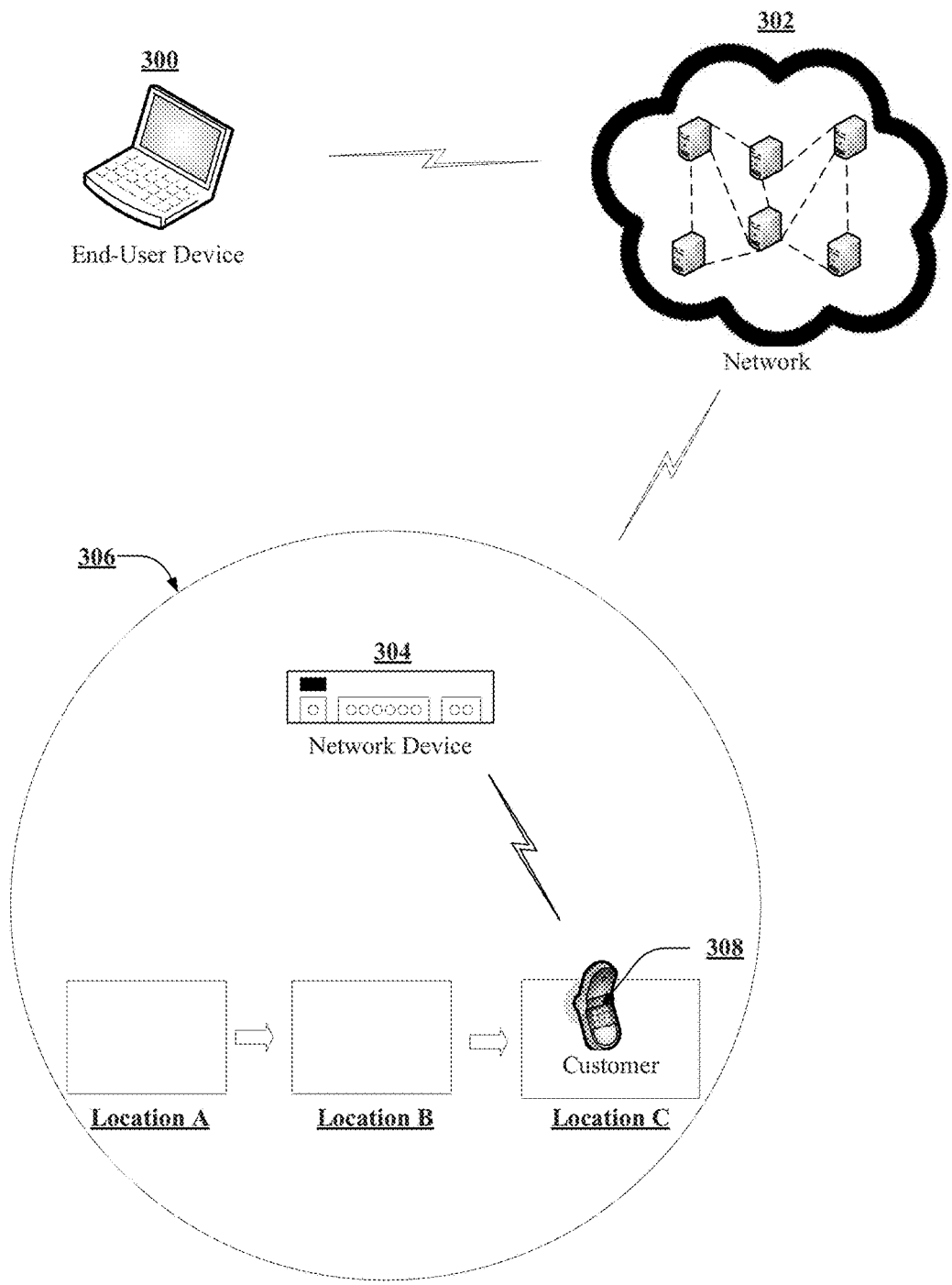
FIG. 3 illustrates an example system for determining when a mobile device is within range of a network device and communicating mobile device location data, representative of previous and current mobile device locations, to the network based on a defined rule.

Referring now to FIG. 3, illustrated is a system for determining when a mobile device 308 is within a range 306 of a network device 304 and communicating mobile device 308 location data, representative of previous and current mobile device locations, to the network based on a defined rule. An end-user device 300 can be used to store or transmit data to the network 302. The end-user device 300 can be any device that can connect to the network 302 including, but not limited to, a mobile phone, a laptop, etc. The end-user device 300 can connect to the network 302 via any wireless means including, but not limited to, the internet, Wi-Fi, Bluetooth, 3G, 4G, or the like.

A subscription-based platform, including a service or application, can be accessed via the end-user device 300. The subscription-based platform can allow selection of rules at an end-user device 300 to apply to the network device 304. The subscription-based platform can require a fee for opting into the service to set rules for the network devices 304. For example, the end-user device 300 can allow for defining a range 306 of the network device to be twenty feet. Thus, in the previous scenario, a mobile device 308 must be within twenty feet of the network device 304 before any communication can take place. The mobile device 308 can connect to the network 302 via the network device 304 by any wireless means including, but not limited to, the internet, Wi-Fi, Bluetooth, 3G, 4G, or the like. Other rules can also be defined at the end-user device 300. For instance, the end-user device 300 can allow for setting a rule to have a message sent to any mobile device 308 within the range 306 of the network device 304.

The message sent to the mobile device 308 can include, but is not limited to, text, video, coupons, etc. The message sent to the mobile device 308 can also prompt a mobile device user, namely a customer, to perform some action at the mobile device 308. The network device 304 can receive data from the mobile device 308 including, but not limited to, network device-prompted responses, current mobile device 308 location data, previous mobile device 308 location data, time a mobile device 308 has spent in a specific location, etc. In FIG. 3, the network device 304 can communicate to the network 302 that the mobile device 308 was located at Location A before proceeding to Location B and then to Location C.

The network device 304 can also receive data from the mobile device 308 with regard to its distance from other mobile devices 308 within the range 306. Data relating to a mobile device's 308 distances from other mobile devices 308 can be used to determine customer habits based on location information. The data received by the network device 304 can be stored at the network device 304 and/or forwarded to the network 302. The network 302 can store the data received from the network device 304 and/or forward the data to the subscription-based platform. The subscription-based platform can allow an end-user to access and analyze the aggregated data from the end-user device 300.

Figure 4:
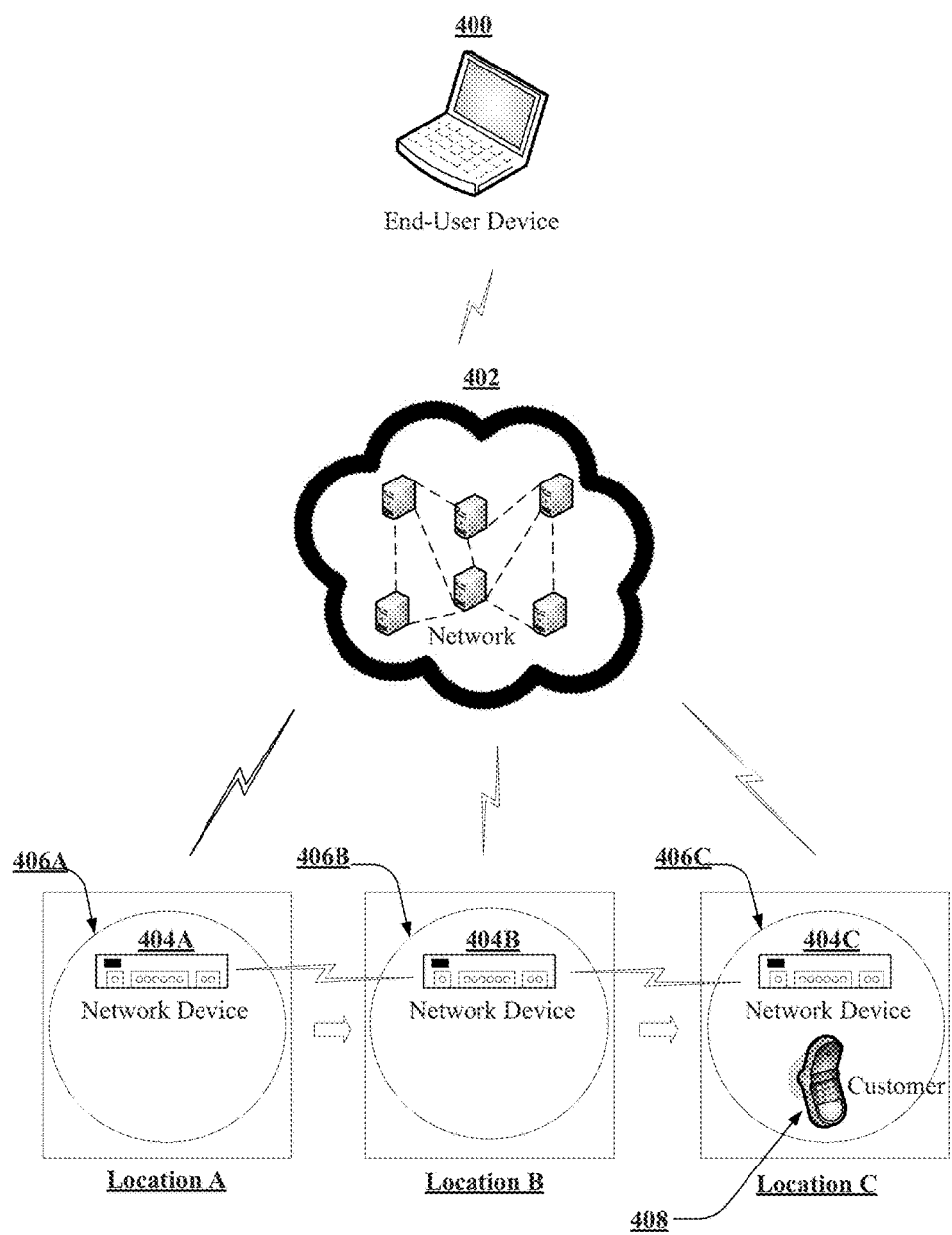
FIG. 4 illustrates an example system for several network devices associated with several locations communicating mobile device location data, representative of previous and current mobile device locations, to the network based on a defined rule.

Referring now to FIG. 4, illustrated is a system for several network devices 404A, 404B, 404C associated with several locations (Location A, Location B, and Location C) communicating mobile device 408 location data, representative of previous and current mobile device 408 locations, to the network 402 based on a defined rule. An end-user device 400 can be used to store or transmit data to the network 402. The end-user device 400 can be any device that can connect to the network 402 including, but not limited to, a mobile phone, a laptop, etc. The end-user device 400 can connect to the network 402 via any wireless means including, but not limited to, the internet, Wi-Fi, Bluetooth, 3G, 4G, or the like.

A subscription-based platform, including a service or application, can be accessed via the end-user device 400. The subscription-based platform can allow selection of rules at an end-user device 400 to apply to the network devices 404A, 404B, 404C. The subscription-based platform can require a fee for opting into the service to allow for setting rules for the network devices 404A, 404B, 404C. For example, a rule may be set at the end-user device 400 to define a range 406A, 406B, 406C of the network devices 404A, 404B, 404C to be twenty feet. Thus, in the previous example, a mobile device 408 must be within twenty feet of the network devices 404A, 404B, 404C before any communication can take place. The mobile device 408 can connect to the network 402 via the network devices 404A, 404B, 404C by any wireless means including, but not limited to, the internet, Wi-Fi, Bluetooth, 3G, 4G, or the like. Other rules can also be defined at the end-user device 400. For instance, a rule can be set at the end-user device 400 to have a message sent to any mobile device 408 within the ranges 406A 406B 406C of the network devices 404A 404B 404C.

The message sent to the mobile device 408 can include, but is not limited to, text, video, coupons, etc. The message sent to the mobile device 408 can also prompt a mobile device user, namely a customer, to perform some action at the mobile device 408. The network devices 404A, 404B, 404C can receive data from the mobile device 408 including, but not limited to, network device-prompted responses, current mobile device 408 location data, previous mobile device 408 location data, time a mobile device 408 has spent in a specific location, etc. In FIG. 4, each network device 404A, 404B, 404C can communicate current and past location data of the mobile device 408 to the network 402. Network devices 404A, 404B, 404C can also communicate between each other. For instance, network device 404A can communicate to network device 404B that the mobile device 408 was at Location A before proceeding to Location B. Likewise, network device 404B can communicate to network device 404C that the mobile device 408 was at Location B before proceeding to Location C.

The network devices 404A, 404B, 404C can also receive data from the mobile device 408 with regard to its distance from other mobile devices 408 within the ranges 406A, 406B, 406C. Data relating to a mobile device's 408 distances from other mobile devices 408 can be used to determine customer habits based on location information. The data received by the network devices 404A, 404B, 404C can be stored at each respective network device 404A, 404B, 404C and/or forwarded to the network 402. The network 402 can store the data received from the network devices 404A, 404B, 404C and/or forward the data to the subscription-based platform. The subscription-based platform can allow for access and analysis of the aggregated data from the end-user device 400.

Figure 5:
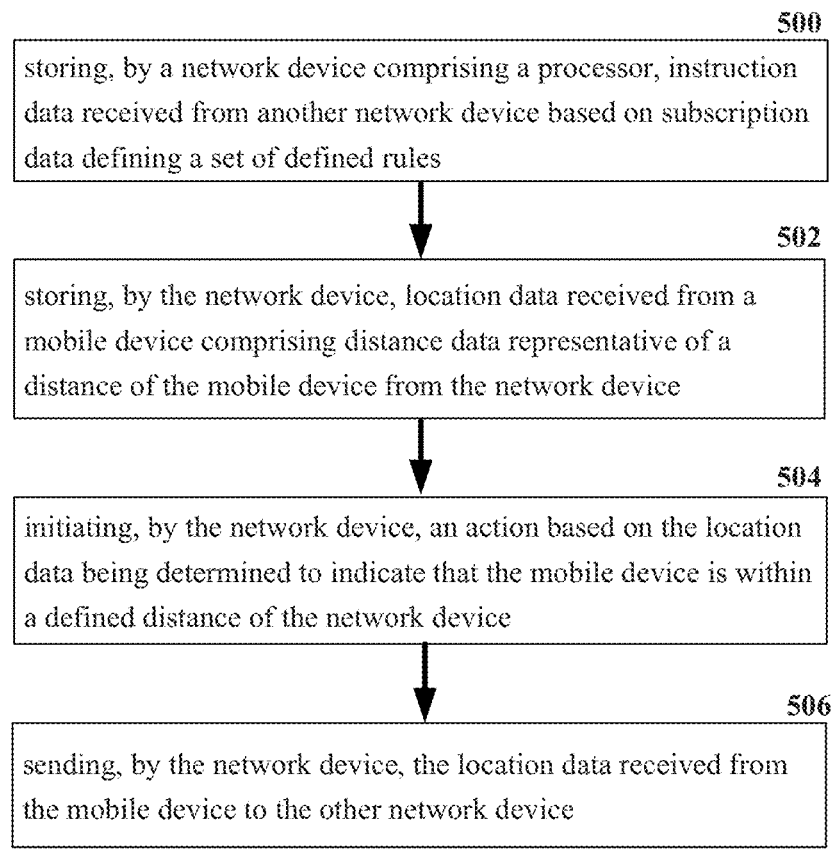
FIG. 5 illustrates an example flow diagram of a method for communicating mobile device data to the network and performing an action based on a defined rule.

Referring now to FIG. 5, illustrated is a schematic process flow diagram of a method for communicating mobile device data to a network and performing an action based on a defined rule. Element 500 can use store instruction data received from another network device based on subscription data defining a set of defined rules. A subscription-based platform, including a service or application, can be accessed via an end-user device. The subscription-based platform can allow for a determination of which rules to apply to the network device of element 500. The subscription-based platform can require a fee for opting into the service to set rules for the network device of element 500. Element 502 can store location data received from a mobile device comprising distance data, representative of a distance of the mobile device from the network device. For example, the end-user device can allow for setting a rule to define a range of the network device to be twenty feet. Thus, based on the previous example, a mobile device must be within twenty feet of the network device before any communication can take place. The mobile device can connect to the network via the network device by any wireless means including, but not limited to, the internet, Wi-Fi, Bluetooth, 3G, 4G, or the like. Such communication can then be stored via element 502.

Element 504 can initiate an action based on the location data being determined to indicate that the mobile device is within a defined distance of the network device. The action of element 504 can include, but is not limited to, sending a message, which was generated at the end-user device, to the mobile device within the range of the network device. The message sent to the mobile device can include, but is not limited to, text, video, coupons, etc. The message sent to the mobile device can also prompt a mobile device user, namely a customer, to perform some action at the mobile device.

Element 506 can send the location data received from the mobile device to the other network device. The data received by the network device at element 506 can be stored at network device and/or forwarded to the network. The network can store the data received from the network device and/or forward the data to the subscription-based platform of element 500. The subscription-based platform can allow for access and analysis of the aggregated data from the other network device.

Figure 6:
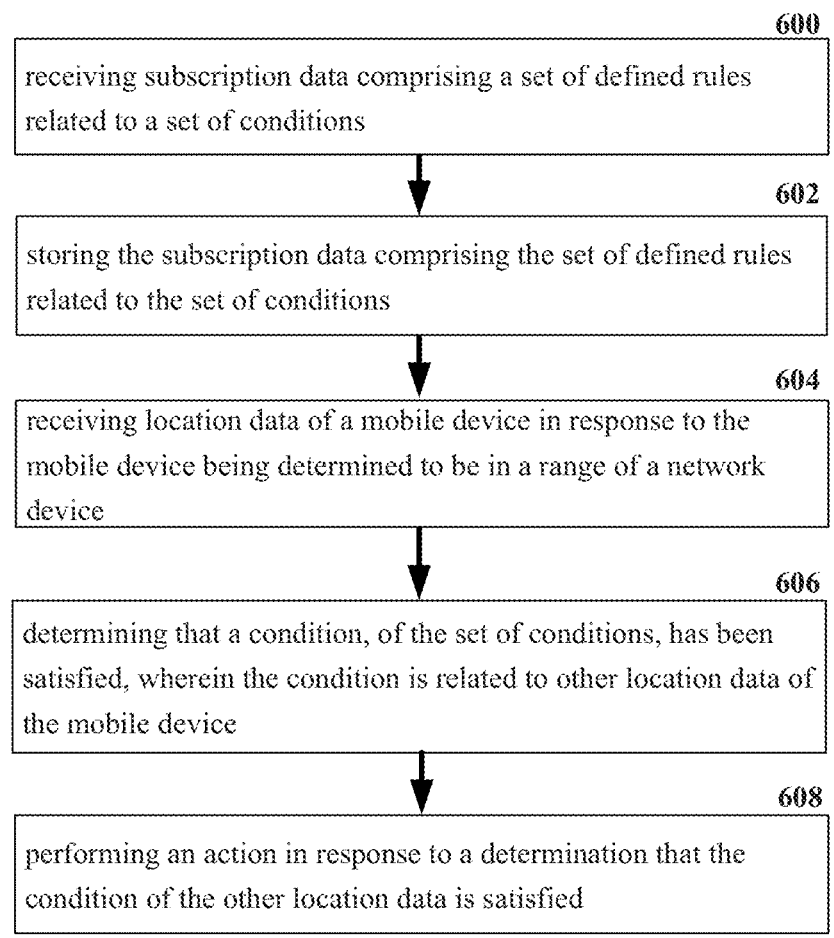
FIG. 6 illustrates an example flow diagram of a system for storing and communicating mobile device data to a network and performing an action based on a defined rule.

Referring now to FIG. 6, illustrated is a schematic process flow diagram of a system for storing and communicating mobile device data to a network and performing an action based on a defined rule. Element 600 can receive subscription data comprising a set of defined rules related to a set of conditions. A subscription-based platform, including a service or application, can be accessed via an end-user device. The subscription-based platform can allow for a determination of which rules to apply to a network device. The subscription-based platform can require a fee for opting into the service to allow for setting of rules for the network device. Element 602 can store the subscription data of element 600 comprising the set of defined rules related to the set of conditions. For example, a rule can be set at the end-user device to define a range of the network device to be twenty feet. Thus, based on the previous example, a mobile device must be within twenty feet of the network device before any communication can take place. The mobile device can connect to the network via the network device by any wireless means including, but not limited to, the internet, Wi-Fi, Bluetooth, 3G, 4G, or the like.

Element 604 can receive location data of a mobile device in response to the mobile device being determined to be in the range of the network device as determined by element 600. Element 606 can determine that a condition, of the set of conditions, has been satisfied, wherein the condition is related to other location data of the mobile device. The location data of the mobile device can include, but is not limited to, network device-prompted responses, current mobile device location data, previous mobile device location data, time a mobile device has spent in a specific location, etc.

Element 608 can perform an action in response to a determination that the condition of the other location data of element 606 is satisfied. The action of element 608 can include, but is not limited to, sending a message, which was generated at the end-user device, to the mobile device within the range of the network device. The message sent to the mobile device can include, but is not limited to, text, video, coupons, etc. The message sent to the mobile device can also prompt a mobile device user, namely a customer, to perform some action at the mobile device.

Figure 7:
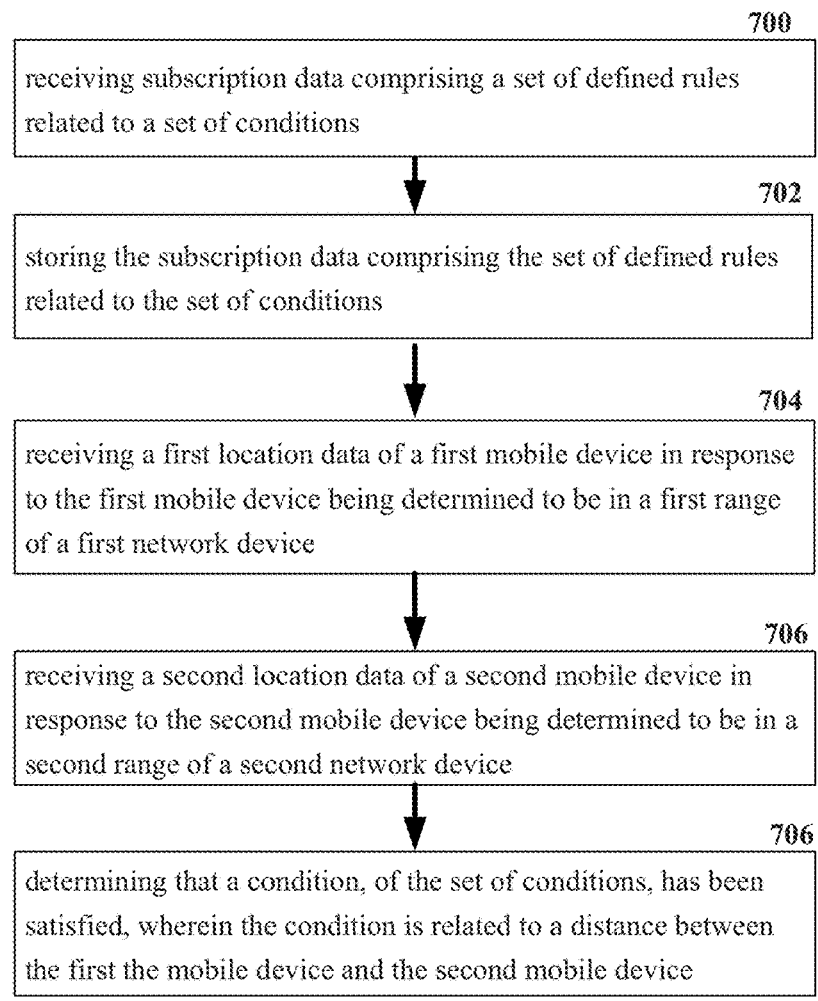
FIG. 7 illustrates an example flow diagram of a computer readable storage medium for communicating mobile device data to a network and performing an action based on a defined rule in relation to a mobile device distance from another mobile device.

Referring now to FIG. 7, illustrated is a schematic process flow diagram of a computer readable storage medium for communicating mobile device data to a network and performing an action based on a defined rule in relation to a mobile device distance from another mobile device. Element 700 can receive subscription data comprising a set of defined rules related to a set of conditions. A subscription-based platform, including a service or application, can be accessed via an end-user device. The subscription-based platform can allow an for a determination of which rules to apply to a network device. The subscription-based platform can require a fee for opting into the service to set rules for the network device.

Element 702 can store the subscription data of element 700 comprising the set of defined rules related to the set of conditions. For example a rule to defining a range of the network device to be twenty feet can be set at the end-user device. Thus, based on the previous example, a mobile device must be within twenty feet of the network device before any communication can take place. The mobile device can connect to the network via the network device by any wireless means including, but not limited to, the internet, Wi-Fi, Bluetooth, 3G, 4G, or the like. Element 704 can receive a first location data of a first mobile device in response to the first mobile device being determined to be in a first range of a first network device. Element 706 can receive a second location data of a second mobile device in response to the second mobile device being determined to be in a second range of a second network device. Element 708 can determine that a condition, of the set of conditions, has been satisfied, wherein the condition is related to a distance between the first mobile device and the second mobile device. The network device can receive distance data from each mobile device within range of their respective network devices. Data relative to a mobile device's distance from other mobile devices can be used to determine customer habits based on location information.

Figure 8:
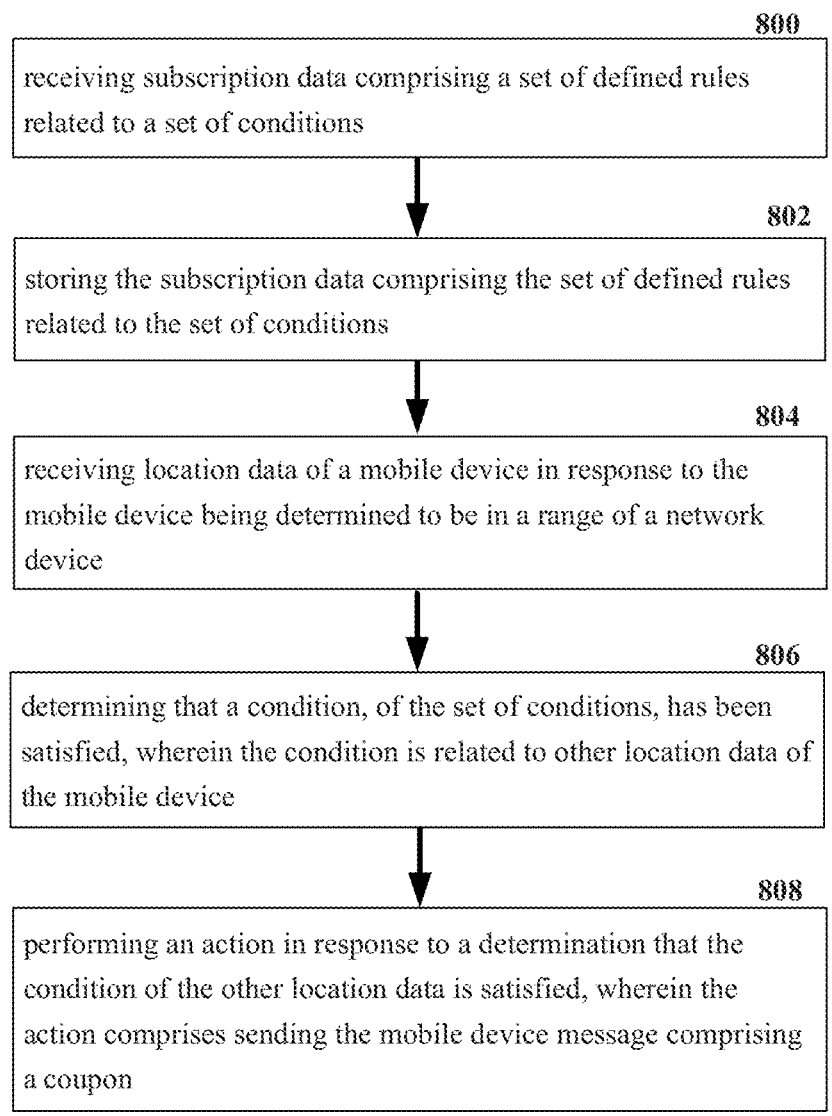
FIG. 8 illustrates an example flow diagram of a system for storing and communicating mobile device data to a network and performing an action comprising sending a coupon.

Referring now to FIG. 8, illustrated is a schematic process flow diagram of a system for storing and communicating mobile device data to a network and performing an action comprising sending a coupon. Element 800 can receive subscription data comprising a set of defined rules related to a set of conditions. A subscription-based platform, including a service or application, can be accessed via an end-user device. The subscription-based platform can allow for a determination of which rules to apply to a network device. The subscription-based platform can require a fee for opting into the service to set rules for the network device. Element 802 can store the subscription data of element 800 comprising the set of defined rules related to the set of conditions. For example, a rule to define a range of the network device to be twenty feet can be set at the end-user device. Thus, a mobile device must be within twenty feet of the network device before any communication can take place. The mobile device can connect to the network via the network device by any wireless means including, but not limited to, the internet, Wi-Fi, Bluetooth, 3G, 4G, or the like.

Element 804 can receive location data of a mobile device in response to the mobile device being determined to be in the range of the network device as determined by element 800. Element 806 can determine that a condition, of the set of conditions, has been satisfied, wherein the condition is related to other location data of the mobile device. The location data of the mobile device can include, but is not limited to, network device-prompted responses, current mobile device location data, previous mobile device location data, time a mobile device has spent in a specific location, etc.

Element 808 can perform an action in response to a determination that the condition of the other location data of element 806 is satisfied. The action of element 808 can include, but is not limited to, sending a message, which was generated at the end-user device, to the mobile device within the range of the network device. The message sent to the mobile device can include, but is not limited to, text, video, coupons, etc. The message sent to the mobile device can also prompt a mobile device user, namely a customer, to perform some action at the mobile device.

Figure 9:
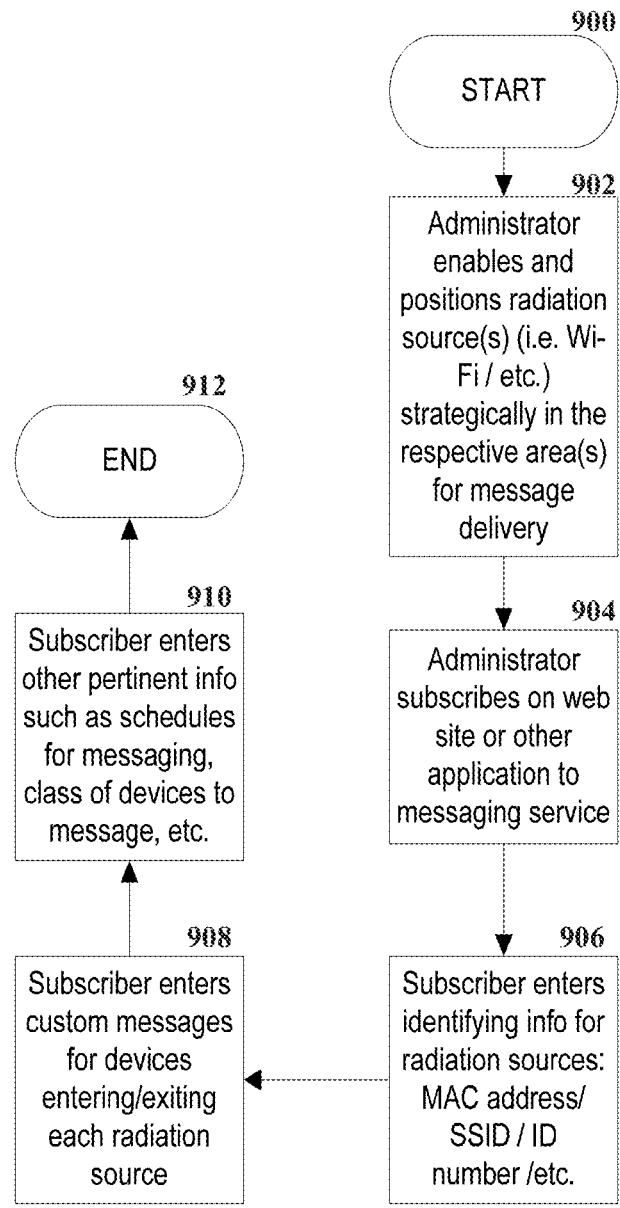
FIG. 9 illustrates an example flow diagram of a method for subscribing to a subscriber-based platform and generating user-defined rules.

Referring now to FIG. 9, illustrated is a schematic process flow diagram of a method for subscribing to a subscriber-based platform and generating user-defined rules. The process can start at element 900. At element 902 an administrator can enable and positions radiation sources strategically in the respective areas for message delivery. Element 904 can allow the administrator to subscribe on a web site or other application messaging service via an end-user device. The end-user device can be used to store or transmit data to the network. The end-user device can be any device that can connect to the network including, but not limited to, a mobile phone, a laptop, etc. The end-user device can connect to the network via any wireless means including, but not limited to, the internet, Wi-Fi, Bluetooth, 3G, 4G, or the like. The subscription-based platform, including a service or application, can be accessed via the end-user device. The subscription-based platform can allow for a determination of which rules to apply to the network device. At element 906 the subscriber can enter identifying information for the radiation sources including, but not limited to, MAC address, service set identification (SSID), identification number, etc. The subscription-based platform can require a fee for opting into the service to set rules for the network devices.

The subscriber can enter custom messages for devices entering/exiting each radiation source at element 908. The message sent to the mobile device can include, but is not limited to, text, video, coupons, etc. The message sent to the mobile device can also prompt a mobile device user, namely a customer, to perform some action at the mobile device. The mobile device can connect to a network via the network device by any wireless means including, but not limited to, the internet, Wi-Fi, Bluetooth, 3G, 4G, or the like. At element 910, the subscriber can enter other pertinent information such as schedules for messaging, class of devices to message, etc. The process can end at element 912.

Figure 10:
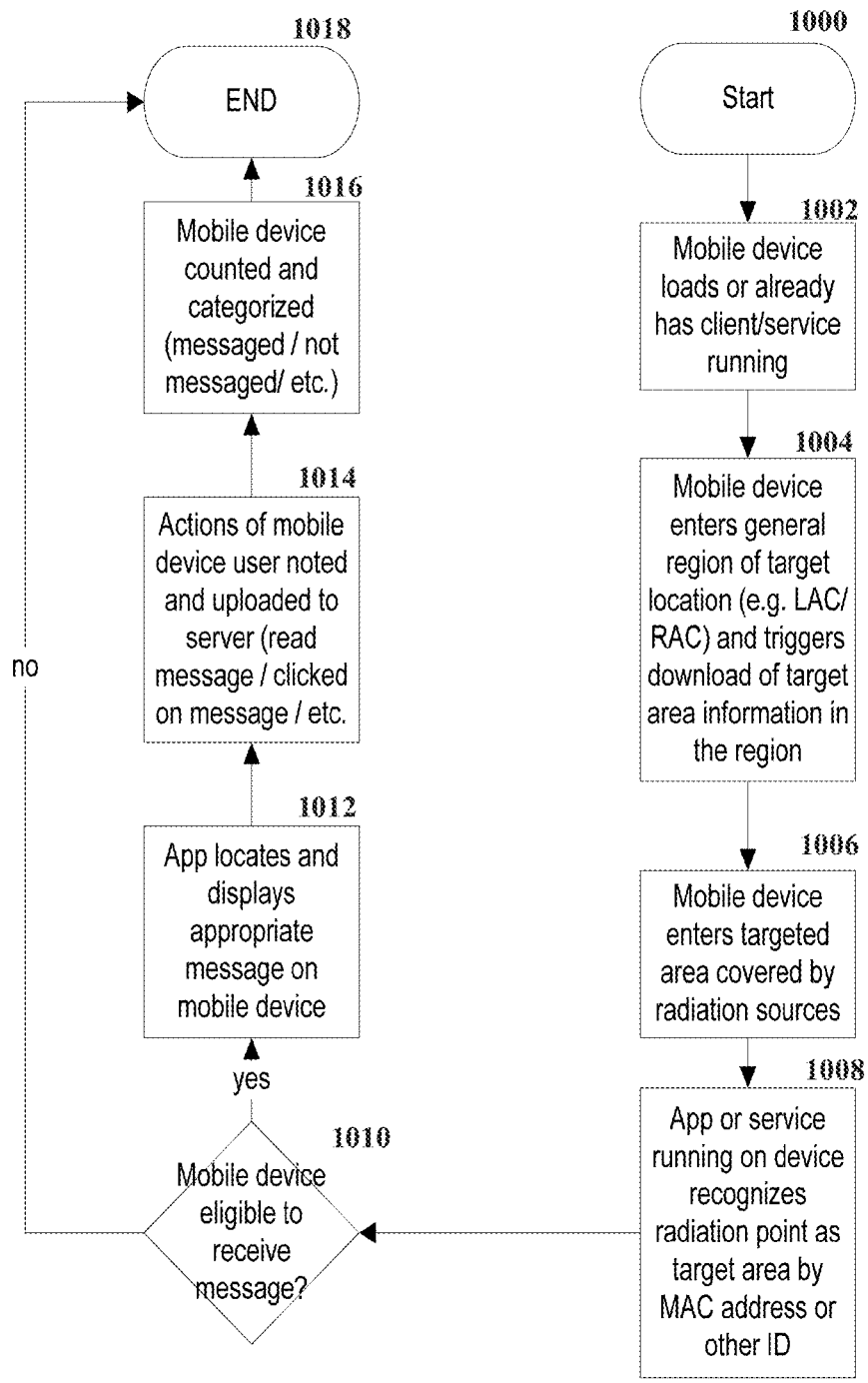
FIG. 10 illustrates an example flow diagram of mobile device entering into the range of a network device and the network device initiating an action based on a user-defined rule.

Referring now to FIG. 10, illustrated is a schematic process flow diagram of mobile device entering into a range of a network device and the network device initiating an action based on a user-defined rule. The process can start at element 1000. A mobile device can load or already has a client/service running at element 1002. At element 1004 the mobile device can enter a general region of a target area location (e.g. location area code (LAC)/routing area code (RAC)) and can trigger download of target area location information in the general region. At element 1006 the mobile device can enter the target area covered by a radiation source. The mobile device can connect to a network via the network device by any wireless means including, but not limited to, the internet, Wi-Fi, Bluetooth, 3G, 4G, or the like.

At element 1008, an application or service running on the mobile device can recognize a radiation point as the target area by a MAC address or other identification. Element 1010 can comprise a decision where the system can determine whether the mobile device is eligible to receive a message. If the system determines that the mobile device is not eligible to receive the message, then the process can end at element 1018. If the system determines that the mobile device is eligible to receive the message, then the process can move to element 1012 where the application can locate and display the appropriate message on the mobile device. The message sent to the mobile device can prompt a mobile device user, namely a customer, to perform some action at the mobile device. At element 1014 actions (read message/clicked on message, etc.) of the mobile device user can be noted and uploaded to a server. The network device can receive data from the mobile device including, but not limited to, network device-prompted responses, current mobile device location data, previous mobile device location data, time a mobile device has spent in a specific location, etc. At element 1016 the mobile device can be counted and categorized (messaged/not messaged/etc.) The process can end at element 1018.

Figure 11:
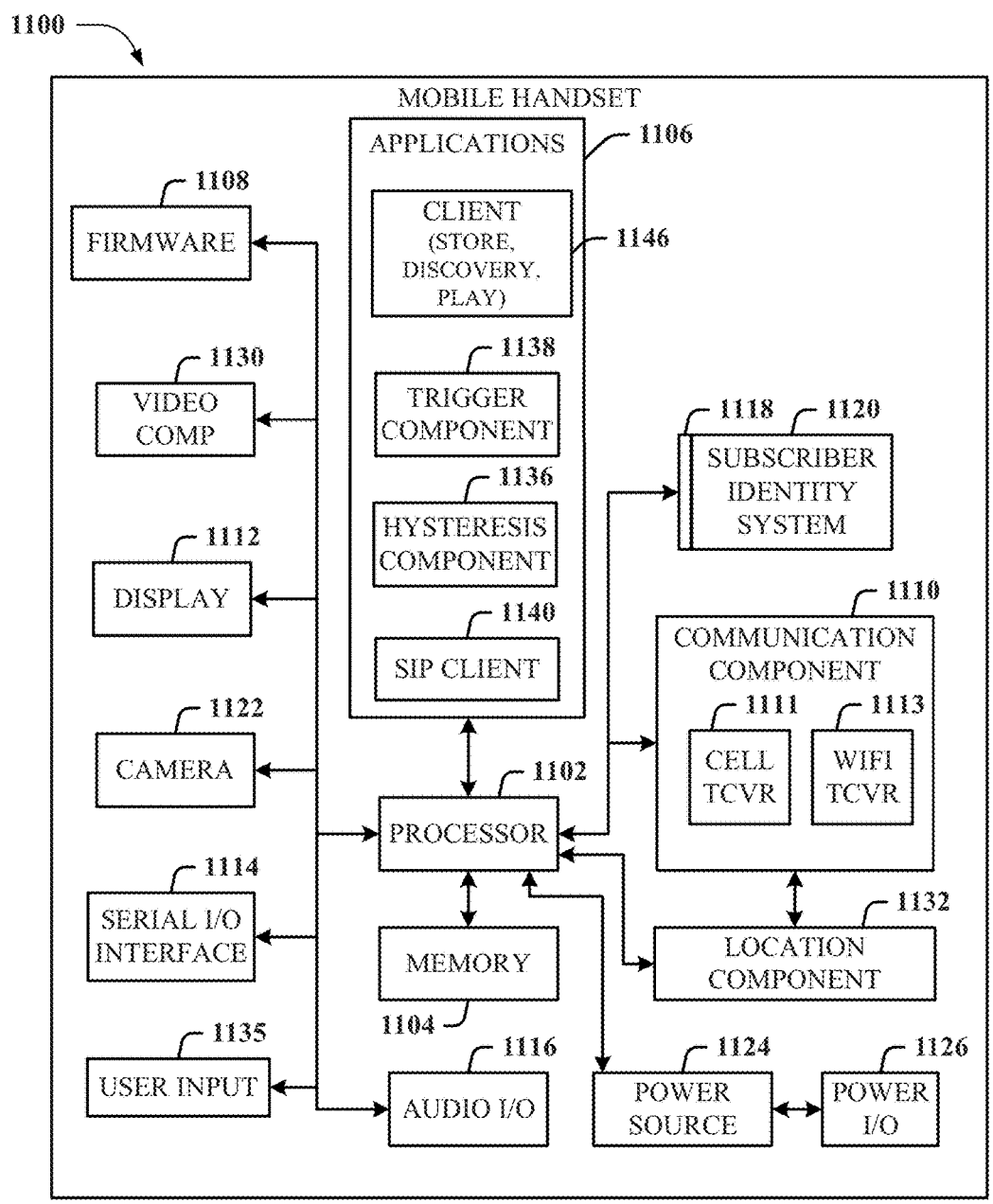
FIG. 11 illustrates a block diagram of an example mobile handset operable to engage in a system architecture that facilitates secure wireless communication according to the embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the innovation described herein. The following discussion is intended to provide a brief, general description of an example of a suitable environment 1100 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., WiFi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
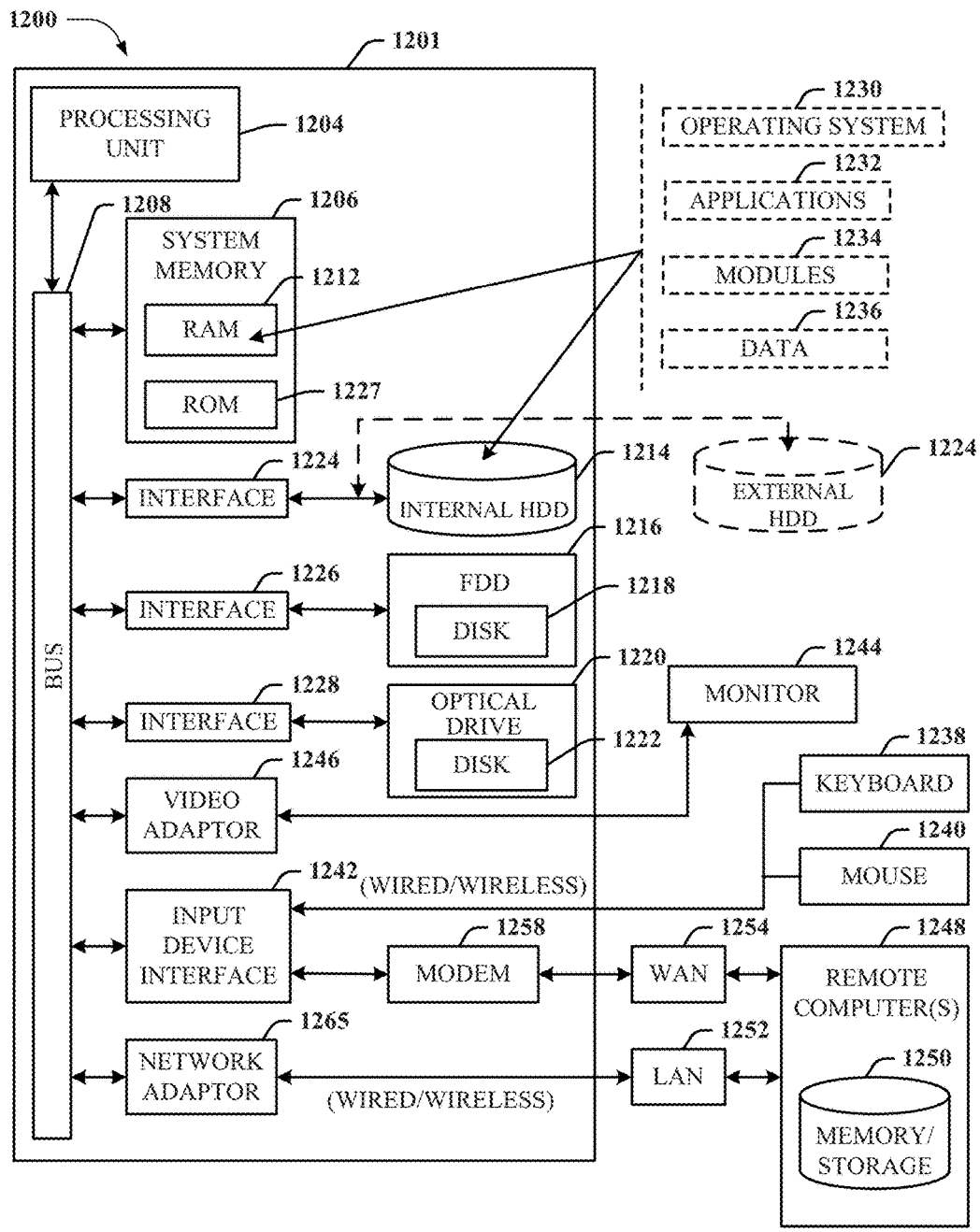
FIG. 12 illustrates a block diagram of an example computer operable to engage in a system architecture that facilitates secure wireless communication according to the embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1211 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the serial port interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a first network device comprising a processor, a first indication that a mobile device is within a defined range of the first network device;
   in response to the first indication and based on a condition associated with subscription data being determined to have been satisfied, sending, by the first network device, display data representative of a display to the mobile device;
   in response to an action determined to be attributable to a user identity associated with the mobile device, receiving, by the first network device, an update associated with the display data from the mobile device, wherein the update comprises a second indication attributable to the user identity that a message has been received; and based on the second indication, categorizing, by the first network device, the mobile device into a category associated with the mobile device being determined to have received the update.

2. The method of claim 1, wherein the defined range is defined by a distance from the first network device.

3. The method of claim 2, wherein the condition is associated with an eligibility criterion based on the subscription data.

4. The method of claim 2, wherein the display data is based on a third indication that the mobile device is not within the defined range.

5. The method of claim 1, wherein the display data comprises video data representing a video to be displayed.

6. The method of claim 1, wherein the display data comprises coupon code data representing a coupon code associated with a coupon.

7. The method of claim 1, wherein the display data prompts for input from the user identity associated with the mobile device to perform the action.

8. A system, comprising:
a processor; and
a memory that stores executable instructions that, when executed by the processor, facilitate performance of operations, comprising:
receiving a first indication that a mobile device is within a defined range of a network device;
based on a determination that an eligibility criterion, associated with the mobile device and a subscription of the mobile device, has been satisfied, sending display data representative of a display to the mobile device;
in response to user input received by the mobile device, receiving an update associated with the display data from the mobile device, wherein the update comprises a second indication that the mobile device has been determined to have received a message; and
based on the second indication, grouping the mobile device into a group of mobile devices that have been determined to have received the message.

9. The system of claim 8, wherein the defined range comprises a diameter in relation to the network device.

10. The system of claim 9, wherein the display data is based on a third indication that the mobile device is entering the diameter.

11. The system of claim 9, wherein the display data is based on a third indication that the mobile device is exiting the diameter.

12. The system of claim 8, wherein the mobile device is a first mobile device, and wherein the operations further comprise:
receiving distance data associated with a distance between the first mobile device and a second mobile device.

13. The system of claim 12, wherein the second mobile device is within the defined range of the network device.

14. The system of claim 8, wherein the operations further comprise:
sending fee data representative of a fee associated with the subscription of the network device.

15. A non-transitory machine-readable medium, comprising executable instructions that, when executed by a processor, facilitate performance of operations, comprising:
based on subscription data associated with a defined rule related to a condition of a network device, sending instruction data related to the defined rule to the network device;
receiving a first indication that a mobile device is within a defined range of the network device;
based on a determination that the condition has been satisfied by the mobile device, sending display data representative of a user prompt to the mobile device;
in response to the sending the display data, receiving indication data representative of a second indication that the user prompt has been to have been presented at the mobile device; and
based on the receiving the indication data, categorizing the mobile device into a category of mobile devices that have been determined to have received the user prompt.

16. The non-transitory machine-readable medium of claim 15, wherein the operations further comprise:
in response to an action, related to the user prompt, attributable to a user identity associated with the mobile device, receiving action data representative of the action.

17. The non-transitory machine-readable medium of claim 16, wherein the action data comprises a third indication that a message has been read.

18. The non-transitory machine-readable medium of claim 17, wherein the operations further comprise:
in response to the receiving the action data, updating category data representative of the category of the mobile devices.

19. The non-transitory machine-readable medium of claim 18, wherein the updating comprises adding the mobile device to the category of mobile devices.

20. The non-transitory machine-readable medium of claim 18, wherein the updating comprises generating count data associated with a count of the mobile devices.

* * * * *